United States Patent [19]

Soeder et al.

[11] Patent Number: 5,386,737
[45] Date of Patent: Feb. 7, 1995

[54] PORTABLE AIRCRAFT RCS VERSUS AZIMUTH MEASUREMENT APPARATUS

[75] Inventors: Walter S. Soeder, Patchogue; John J. Proscia, Northport, both of N.Y.

[73] Assignee: Grumman Aerospace Corporation, Bethpage, N.Y.

[21] Appl. No.: 83,647

[22] Filed: Jun. 25, 1993

[51] Int. Cl.$^6$ .......................... G01S 13/68; B64F 1/24
[52] U.S. Cl. .................... 73/865.9; 180/904; 244/50
[58] Field of Search ............ D12/14; 244/50; 73/1 E, 73/865.9; 180/904

[56] References Cited

U.S. PATENT DOCUMENTS

| | | |
|---|---|---|
| 2,748,486 | 6/1956 | Lord et al. ............... 73/1 E |
| 2,765,650 | 10/1956 | Youngclaus ............... 73/1 E |
| 4,879,560 | 11/1989 | McHenry ............... 342/165 |

FOREIGN PATENT DOCUMENTS

| | | | |
|---|---|---|---|
| 956656 | 6/1949 | France ................... 73/1 E |
| 9205073 | 4/1992 | WIPO ................... 244/50 |

Primary Examiner—Thomas P. Noland
Assistant Examiner—Daniel S. Larkin
Attorney, Agent, or Firm—Collard & Roe

[57] ABSTRACT

Portable RCS versus azimuth measurement apparatus for an aircraft to be tested has a dolly attached to the aircraft at a location on a supporting surface. A nose wheel adapter mounted on the dolly temporarily replaces the nose wheel of the aircraft with a spare nose wheel. An electric motor on the dolly coupled to the spare nose wheel rotates the spare nose wheel. A beam structure has a first end removably affixable to the dolly and a spaced opposite second end extending under the axis of rotation of the aircraft and between the main landing wheels. A synchronizing gearbox, mounted on the second end of the beam structure at the axis of rotation of the aircraft, has an output shaft and senses rotation of the aircraft about the axis of rotation, sensed rotation of the aircraft being indicated by rotation of the output shaft. Rotation of the output shaft of the gearbox is restrained relative to the surface by an anchor. A radar computer signal is utilized to compare signals from the motor and the gearbox to produce an output command to the motor for rotating the spare nose wheel. This rotates the aircraft about its axis of rotation. The gearbox transmits signals indicating sensed rotation of provide data for RCS versus azimuth measurement.

8 Claims, 4 Drawing Sheets

PORTABLE AIRCRAFT RCS VERSUS AZIMUTH MEASUREMENT APPARATUS

BACKGROUND OF THE INVENTION

1. Field of the Invention

The present invention relates to aircraft radar cross-section (RCS) versus azimuth measurement apparatus. More particularly, the invention relates to portable aircraft RCS versus azimuth measurement apparatus.

2. The Prior Art

Permanent aircraft rotation apparatus is either of a turntable type or a pylon type. A turntable apparatus has large diameter structures approximately 5 feet deep and greater than 50 feet in diameter embedded in the ground so that the rotary top surface is substantially coplanar with the surface of the ground. A pylon apparatus utilizes a pole higher than 30 feet which is permanently anchored to the ground via a massive structure. An aircraft is then mounted at the top of the pole.

Although the turntable apparatus functions suitably to rotate an aircraft, the large size of such an apparatus, and the need to submerge it in the ground, make said apparatus unsatisfactory for portable operations. The pylon apparatus is not capable of supporting most aircraft, due to structural weight limitations and is not portable because of its large size and the need to anchor it securely in the ground.

The principal object of the invention is to provide aircraft precision RCS versus azimuth measurement apparatus which is portable.

An object of the invention is to provide portable aircraft RCS versus azimuth measurement apparatus of small size and dimensions.

Another object of the invention is to provide portable aircraft RCS versus azimuth measurement apparatus of light weight which is rollable on wheels along a supporting surface.

Still another object of the invention is to provide portable aircraft RCS versus azimuth measurement apparatus which is pulled to a selected area with facility and ease and is used while resting on a supporting surface such as the ground.

Yet another object of the invention is to provide portable aircraft RCS versus azimuth measurement apparatus which functions efficiently, effectively and reliably to measure RCS versus azimuth.

Another object of the invention is to provide portable aircraft RCS versus azimuth measurement apparatus which is inexpensive in manufacture and in operation.

Still another object of the invention is to provide portable aircraft RCS versus azimuth measurement apparatus which is assembled and used with facility, convenience and rapidity.

Yet another object of the invention is to provide portable aircraft RCS versus azimuth measurement apparatus which is not embedded in the ground when in use.

Another object of the invention is to provide aircraft RCS versus azimuth measurement apparatus which is movable with facility and rapidity to any desired location, however remote.

Still another object of the invention is to provide portable aircraft RCS versus azimuth measurement apparatus which permits the measurement of aircraft RCS at government, contractor, or other locations for manufacturing quality control or post-maintenance inspection.

BRIEF SUMMARY OF THE INVENTION

In accordance with the invention, there is provided a portable RCS versus azimuth measurement apparatus for an aircraft to be tested, wherein the aircraft has a nose landing gear wheel and main landing gear wheels, and comprises dolly means. Nose wheel adapter means is mounted on the dolly means for replacing the nose wheel of the aircraft with a spare nose wheel and is rotated 90° so that the spare nose wheel is substantially perpendicular to the main landing wheels. Synchronizing gearbox means is positioned under the aircraft substantially at the axis of rotation of the aircraft and is substantially rigidly coupled to the dolly means. The synchronizing gearbox means has an output shaft and senses rotation of the aircraft about the axis of rotation, sensed rotation of the aircraft being indicated by rotation of the output shaft. Synchronous anchor means on the surface beneath the output shaft of the synchronizing gearbox restrains rotation of the output shaft relative to the surface. Control means is electrically connected to the dolly means and to the synchronizing gearbox means for utilizing a radar computer signal to compare signals from the dolly means and from the synchronizing gearbox means to produce an output command to the dolly means for rotating the spare nose wheel thereby rotating the aircraft about an axis substantially at the output shaft of the synchronizing gearbox. The synchronizing gearbox transmits signals indicating sensed rotation of the aircraft to the control means thereby providing data for RCS versus azimuth measurement.

The dolly means comprises a frame and an electric motor mounted on the frame and coupled to the spare nose wheel for rotating the spare nose wheel. The dolly means has motor means. Nose wheel adapter means is mounted on the dolly means and removably installable in replacement of the nose wheel of the aircraft for temporarily replacing the nose wheel with a spare nose wheel. The motor means is coupled to the spare nose wheel for rotating the spare nose wheel. The dolly means is rotated 90° so that the spare nose wheel is substantially perpendicular to the main landing wheels. Beam means has a first end removably affixable to the dolly means and a spaced opposite second end extending under the aircraft and under the axis of rotation of the aircraft and between the main landing wheels. Synchronizing gearbox means is mounted on the beam means at the second .end thereof and substantially at the axis of rotation of the aircraft. The synchronizing gearbox means has an output shaft and senses rotation of the aircraft about the axis of rotation, sensed rotation of the aircraft being indicated by rotation of the output shaft. Synchronous anchor means on the surface beneath the second end of the beam means restrains rotation of the output shaft of the synchronizing gearbox relative to the surface.

Electronic control means electrically connected to the motor means and to the synchronizing gearbox means utilizes a radar computer signal to compare signals from the motor means and from the synchronizing gearbox means to produce an output command to the motor means for rotating the spare nose wheel thereby rotating the aircraft about an axis substantially coincident with the axis of rotation of the aircraft. The synchronizing gearbox transmits signals indicating sensed rotation of the aircraft to the electronic control means thereby providing data for RCS versus azimuth measurement.

The dolly means comprises a frame having a detachable entry bar and the motor means is an electric motor mounted on the frame. The aircraft nose wheel has an axle having spaced opposite ends and the dolly means further comprises a tachometer integral with the motor, adjustable nose gear axle locating pins for alignment with the two ends of the nose gear axle of the aircraft and engagement with the two ends and drive means coupling the electric motor to the spare nose wheel for rotating the spare nose wheel.

The nose wheel adapter has a nose wheel adapter sprocket affixed to the spare nose wheel and the drive means of the dolly means comprises gear reduction means coupled to the electric motor, a drive sprocket coupled to the gear reduction means, a nose wheel adapter sprocket coupled to the spare nose wheel, and a drive chain linking the drive sprocket and the nose wheel adapter sprocket, whereby the electric motor rotates the spare nose wheel.

The beam means has centering cable attachment means in the area of its second end and the apparatus further comprises centering cable means affixed to the centering cable attachment means and the main wheels for centering the output shaft of the synchronizing gearbox means equidistantly between the main wheels. The centering cable attachment means of the beam means comprises a pair of affixing means on spaced opposite sides of the beam means adjacent its second end and the centering cable means comprises a pair of tension cables, each having a first end affixed to a corresponding one of the affixing means and a spaced opposite second end affixed to a corresponding one of the main wheels and a pair of slack eliminating means each connected in a corresponding one of the pair of tension cables.

The synchronous anchor means comprises a base plate having a center on the surface beneath the output shaft of the synchronizing gearbox means with its center in alignment with the output shaft and vertical misalignment means on the bottom of the output shaft for permitting slight vertical misalignment of the output shaft with the axis of rotation of the aircraft while maintaining the synchronizing gearbox fixed in rotation. The vertical misalignment means comprises a telescope joint affixed to the bottom of the output shaft of the synchronizing gearbox and a universal joint affixed between the telescope joint and the center of the base plate. The synchronous anchor means further comprises horizontal misalignment means affixed to the top surface of the base plate for permitting slight horizontal misalignment of the output shaft of the synchronizing gearbox with the axis of rotation of the aircraft while maintaining the synchronizing gearbox fixed in rotation. The horizontal misalignment means comprises loops mounted in closely spaced parallel relation with the top surface of the base plate, a coupling joint coupling the loops to each other for movement in planes parallel to the top surface of the base plate at one end of each of the loops, a mounting joint coupling the spaced opposite end of one of the loops to the top surface of the base plate and a rotary axis joint coupled to the spaced opposite end of the other of the loops under the output shaft of the synchronizing gearbox and resting on the surface of the base plate.

The dolly means further comprises a plurality of detachable idler wheels removably affixed to the frame of the dolly means for permitting balanced movement of the dolly means on the surface and a pair of support wheels affixed forward and aft to the frame of the dolly means and cover means for covering the dolly means.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
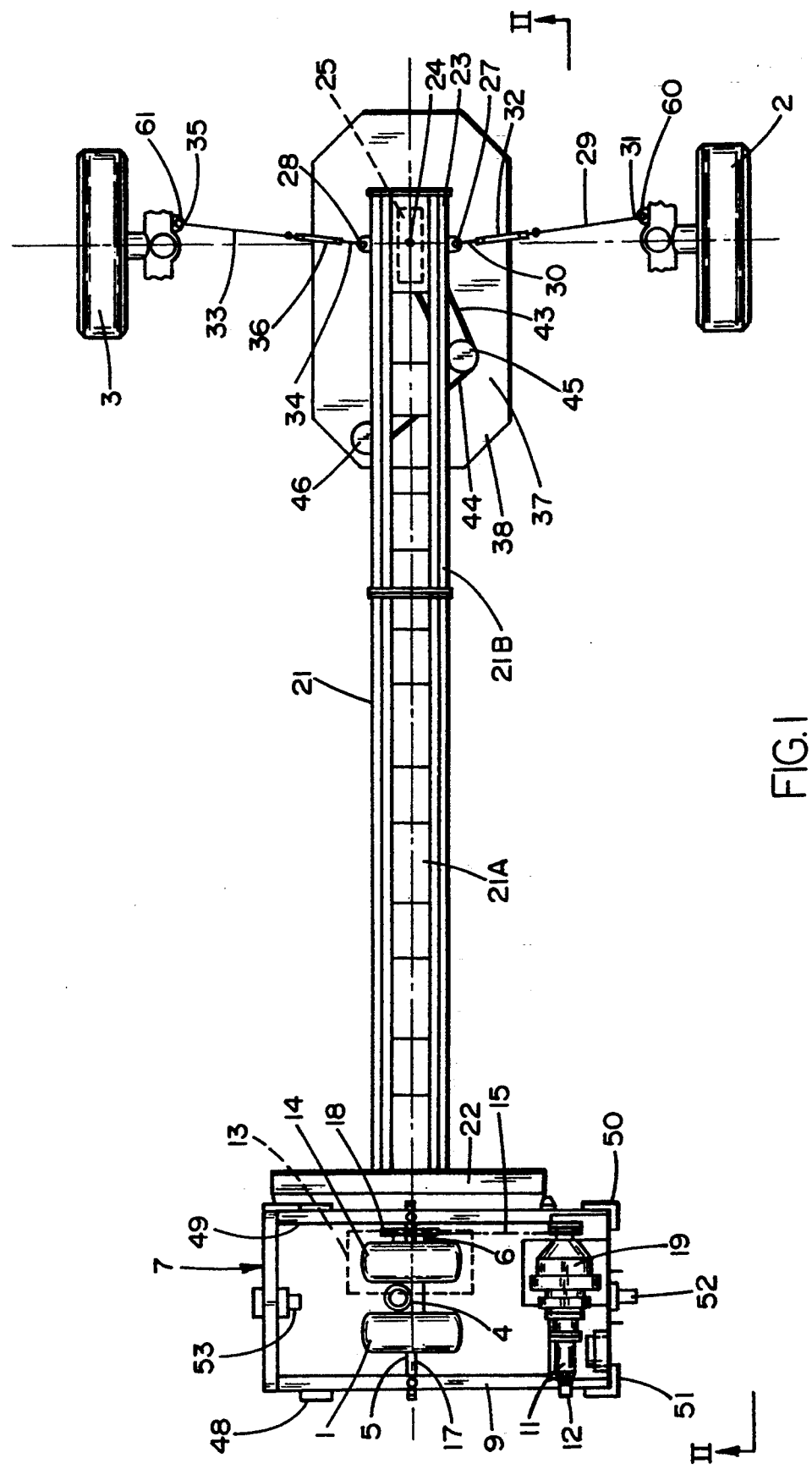
FIG. 1 is a top plan view of an embodiment of the portable aircraft RCS versus azimuth measurement apparatus of the invention.

The portable RCS versus azimuth measurement apparatus of the invention is for an aircraft to be tested (not shown in the FIGS.) having a nose landing gear wheel 1 (FIGS. 1 and 2), which may be one of a pair of nose landing gear wheels such as, for example, the left nose landing gear wheel, and main landing gear wheels 2 and 3 (FIGS. 1 and 2), which may be of a plurality of main landing gear wheels. The nose landing gear wheel 1 has an axle 4 (FIG. 1) having spaced opposite ends 5 and 6.

A dolly 7 has a frame 9 (FIGS. 1 to 4) having a detachable entry bar 10 (FIGS. 3, 4 and 5) and an electric motor 11 mounted on said frame (FIGS. 1 to 3, 5 and 6). A tachometer 12 is integral with the electric motor 10 (FIGS. 1 to 5).

A nose wheel adapter 13 (FIG. 1) is mounted on the dolly 7 and is removably installable in replacement of a nose wheel of the aircraft and temporarily replaces the nose wheel with a spare nose wheel 14, as shown in FIGS. 1 to 5. The electric motor 11 is coupled to the spare nose wheel 14 via a drive chain 15 (FIGS. 1 to 5), as hereinafter described.

Adjustable nose landing gear wheel axle locating pins 16 and 17 (FIGS. 1 and 3) are provided on the frame 9 of the dolly 7 for alignment with the two ends 5 and 6 of the nose gear axle 4 of the aircraft and engagement with said two ends (FIG. 1). The dolly 7 is rotated 90°, as shown in FIGS. 1 and 2, so that the spare nose wheel 14 is substantially perpendicular to the main landing gear wheels (FIGS. 1 and 2).

Figure 2:
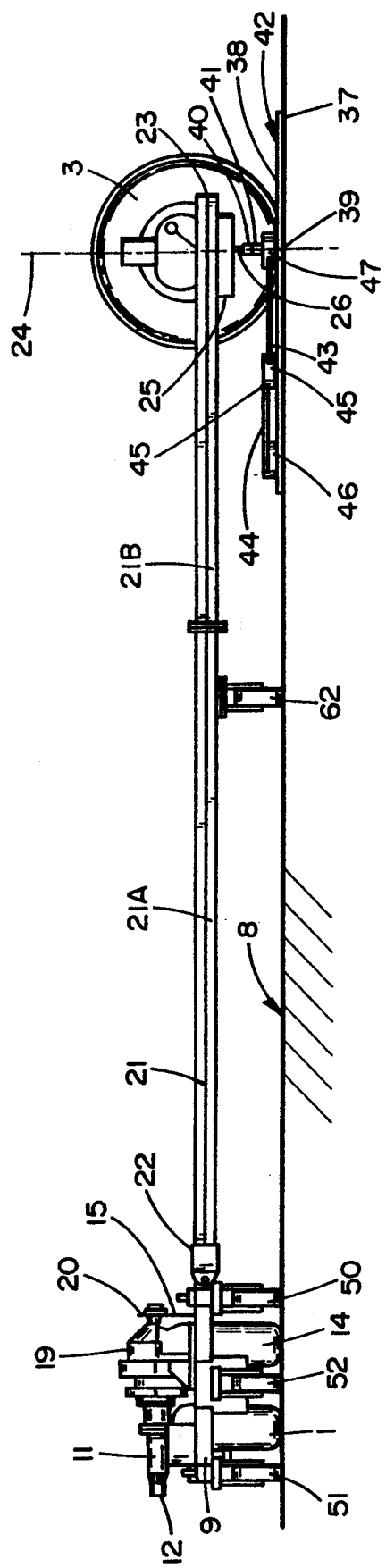
FIG. 2 is a side view, taken along the lines II—II, of FIG. 1.
Figure 3:
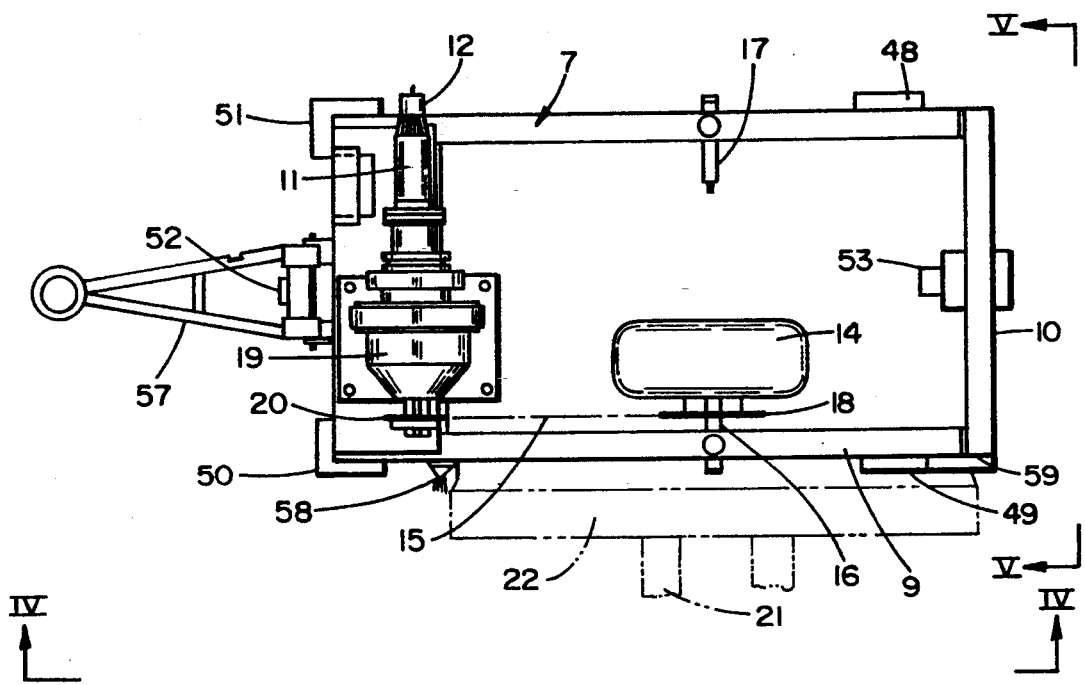
FIG. 3 is a top plan, on an enlarged scale, of the dolly means and nose wheel adapter means of FIG. 1.
Figure 4:
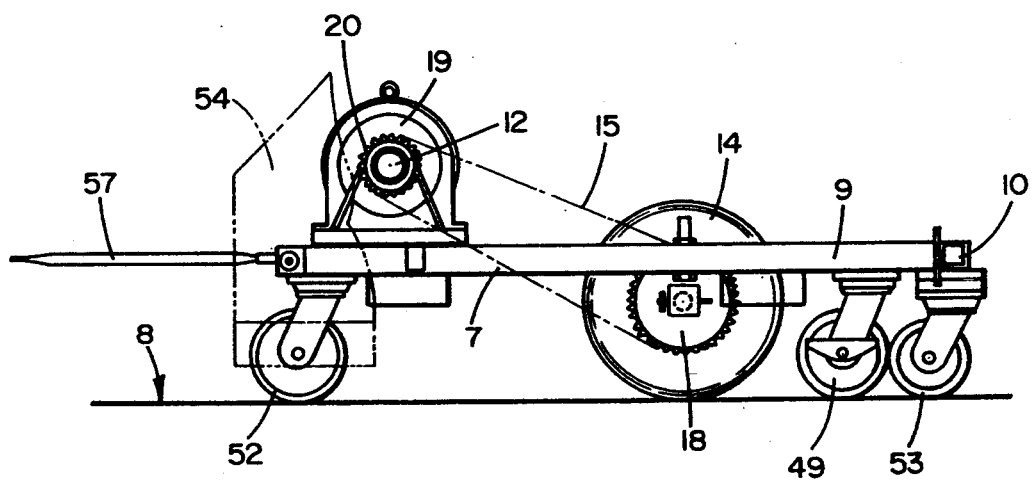
FIG. 4 is a side view, taken along the lines IV—IV, of FIG. 3.
Figure 5:
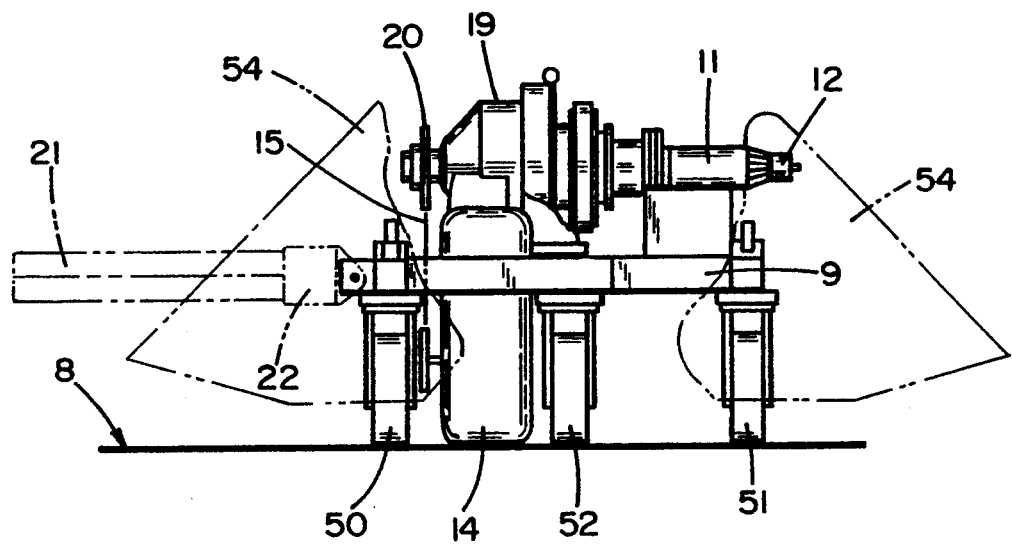
FIG. 5 is an end view, taken along the lines V—V, of FIG. 3.
Figure 6:
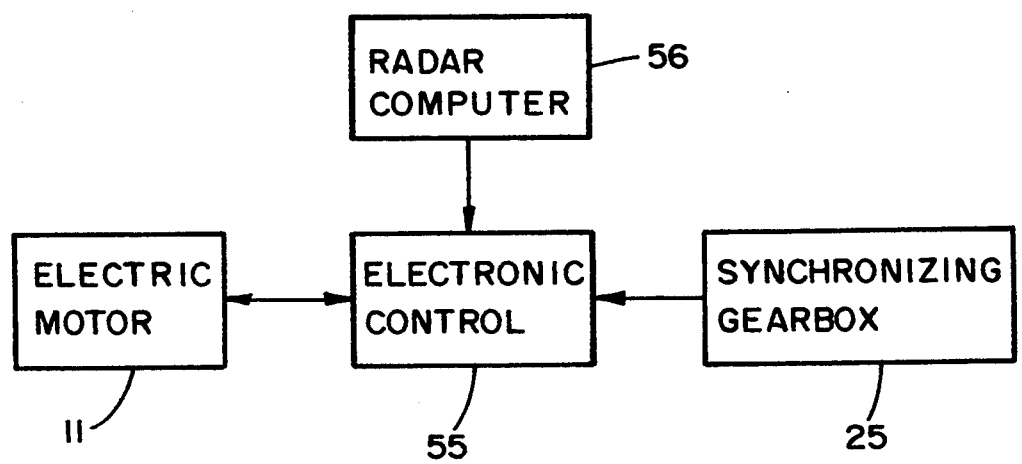
FIG. 6 is a block diagram of an embodiment of the electronic control means of the apparatus of the invention.

The nose wheel adapter 13 has a nose wheel adapter sprocket 18 affixed to the spare nose wheel 14 (FIGS. 1, 3 and 4). A gear reduction device 19 is coupled to the electric motor 11 (FIGS. 1 to 5). A drive sprocket 20 is coupled to the gear reduction device 19 (FIGS. 2 to 5). The drive chain 15 links the drive sprocket 20 and the nose wheel adapter sprocket 18 (FIGS. 1 to 5) whereby the electric motor 11 rotates the spare nose wheel 14.

A beam structure 21 (FIGS. 1 to 3 and 5) has a first end 22 removably affixable to the dolly 7 (FIGS. 1 to 3 and 5) and a spaced opposite second end 23 extending under the aircraft and under the axis of rotation 24 of said aircraft (FIG. 2) and between the main landing gear wheels 2 and 3, as shown in FIGS. 1 and 2. A synchronizing gearbox (FIGS. 1 and 2) 25 is mounted on the beam structure 21 at the second end 23 thereof and substantially at the axis of rotation 24 of the aircraft. The synchronizing gearbox 25 has an output shaft 26 (FIG. 2) and senses rotation of the aircraft about the axis of rotation 24; sensed rotation of the aircraft being indicated by rotation of said output shaft. The beam structure 21 is linearly extendable and therefore has two parts 21A and 21B affixed axially to each other (FIGS. 1 and 2).

The beam structure 21 has centering cable attachment devices 27 and 28 for affixing cables on spaced opposite sides of said beam structure adjacent its second end 23 (FIG. 1). A centering tension cable 29 has a first end 30 affixed to the centering cable attachment device 27 and a spaced opposite second end 31 affixed to the left main landing gear wheel 2 (FIG. 1). A slack eliminating device 32 of any suitable known type, such as, for example, a turnbuckle, is connected in the tension cable 29, as shown in FIG. 1. A centering tension cable 33 has a first end 34 affixed to the centering cable attachment device 28 and a spaced opposite second end 35 affixed to the right main landing gear wheel 3 (FIG. 1). A slack eliminating device 36 of any suitable known type, such as, for example, a turnbuckle, is connected in the tension cable 33, as shown in FIG. 1. The centering cables 29 and 33 center the output shaft 26 of the synchronizing gearbox 25 equidistantly between the main landing gear wheels 2 and 3 of the aircraft to be tested.

A synchronous anchor 37 (FIGS. 1 and 2) is placed on the surface 8 beneath the second end 23 of the beam structure 21, as shown in FIGS. 1 and 2, for restraining rotation of the output shaft 26 of the synchronizing gearbox 25 relative to said surface. The synchronous anchor 37 comprises a base plate 38 having a center 39 (FIG. 2) on the surface 8 beneath the output shaft 26 of the synchronizing gearbox 25 (FIG. 2). The base plate 38 is positioned with its center 39 in alignment with the output shaft 26 of the synchronizing gearbox 25 (FIG. 2).

The synchronous anchor 37 has a vertical misalignment device on the bottom of the output shaft 26 for permitting slight vertical misalignment of said output shaft with the axis of rotation 24 of the aircraft while maintaining the synchronizing gearbox fixed in rotation (FIG. 2). The vertical misalignment device comprises a telescopic joint 40 affixed to the bottom of the output shaft 26 of the synchronizing gearbox 25 and a universal joint 41 affixed between said telescopic joint and the center 39 of the base plate 38 (FIG. 2).

The synchronous anchor 37 also has a horizontal misalignment device affixed to the top surface 42 (FIG. 2) of the base plate 38 for permitting slight horizontal misalignment of the output shaft 26 of the synchronizing gearbox 25 with the axis of rotation 24 of the aircraft while maintaining said synchronizing gearbox fixed in rotation (FIGS. 1 and 2). The horizontal misalignment device comprises links or loops 43 and 44 (FIGS. 1 and 2) mounted in closely spaced parallel relation with the top surface 42 of the base plate 38, as shown in FIGS. 1 and 2. A coupling joint 45 couples the loops 43 and 44 to each other (FIGS. 1 and 2) for movement in planes parallel to the top surface 42 of the base plate 38 at one end of each of said loops. A mounting joint 46 couples the spaced opposite end of the loop 44 to the top surface 42 of the base plate 38 (FIGS. 1 and 2). A rotary axis joint 47 (FIG. 2) is coupled to the spaced opposite end of the loop 43 under the output shaft 26 of the synchronizing gearbox 25 and rests on the surface 42 of the base plate 38, as shown in FIG. 2.

A plurality of detachable idler wheels 48, 49, 50 and 5 are removably affixed to the frame 9 of the dolly 7, as shown in FIGS. 1 and 3, for permitting balanced movement of said dolly on the surface 8. A pair of support wheels 52 and 53 are affixed forward and aft of the frame 9 of the dolly 7 (FIGS. 1, 3 and 4). A cover 54 (FIGS. 4 and 5) may be used to cover the dolly 7.

An electronic control 55 is electrically connected to the electric motor 11 and to the synchronizing gearbox 25 (FIG. 6) for utilizing a signal from a radar computer 56 (FIG. 6) to compare signals from said motor and from said synchronizing gearbox to produce an output command to said motor for rotating the spare nose wheel 14. Rotation of the spare nose wheel 14 rotates the aircraft substantially about the axis of rotation 24. The synchronizing gearbox 25 transmits signals indicating sensed rotation of the aircraft to the electronic control 55 (FIG. 6) thereby providing data for RCS versus azimuth measurement. A tow bar 57 is detachably affixed to the forward end of the frame 9 of the dolly 7.

In operation, the aircraft is towed to the location selected for the RCS test on the surface 8. The nose wheel adapter 13 is then installed on the aircraft to be tested in place of one of the aircraft's normal nose wheels. The dolly 7, beam structure 21, synchronous anchor 37 and the centering cables 29 and 33 are moved to the vicinity of the aircraft. The detachable tow bar 57 is then removed from the dolly 7. The cover 54 is also removed from the dolly 7. The detachable entry bar 10 of the frame 9 is removed from the dolly 7. This permits the dolly 7 to be repositioned so that the adjustable nose gear axle locating pins 16 and 17 are aligned with the two ends of the nose gear axle of the aircraft. The pins 16 and 17 are adjusted and engaged with ends 6 and 5, respectively, of the nose gear axle 4. The detachable entry bar 10 is then reinstalled on the frame 9 of the dolly 7. The nose gear of the aircraft and dolly are steered to the 90 degree position, pointing to the right.

The drive chain 15 is then installed by removing a master link, threading the chain around the nose wheel adapter sprocket 18 and the drive sprocket 20 and then reinstalling the master link. The detachable idler wheels 48, 49, 50 and 51 are then removed from the dolly 7. The beam structure 21 is then affixed to beam assembly attachment points 58 and 59 (FIG. 3) on the frame 9 of the dolly 7, so that said beam structure extends under the aircraft. The cover 54 is then reattached to the dolly 7. The length of the beam structure 21 is designed specifically for the aircraft to be tested, so that the output shaft 26 of the synchronizing gearbox 25 is near the axis of rotation 24 of said aircraft. One end of each of the two centering cables 29 and 33 is affixed to the centering cable attachment devices 27 and 28 of the beam structure 21, and the other end of each of said cables is affixed to a corresponding one of the main landing gear wheels 2 and 3 of the aircraft. The turnbuckles 32 and 36 are then tightened to take all slack out of the cables 29 and 33 and to center the output shaft 26 of the synchronizing gearbox 25 halfway between the aircraft main landing gear wheels 2 and 3. The second end 31 of the centering cable 29 is affixed to the main landing gear wheel 2 via a left main landing gear coupling 60 and the second end 35 of the centering cable 33 is affixed to the main landing gear wheel 3 via a right main landing gear coupling 61, as shown in FIG. 1. A beam structure support wheel 62 (FIG. 2) supports said beam structure in the area of joinder of its parts 21A and 21B.

The synchronous anchor 37 is positioned on the surface or ground 8 beneath the beam structure 21 so that its center is aligned with the output shaft 26 of the synchronizing gearbox 25. The telescopic joint 40 is then connected to the output shaft 26 of the synchronizing gearbox 25. Electrically conductive cable is then used to connect the electric motor 11 and the synchronizing gearbox 25 to the electronic control 55.

The apparatus of the invention is operated as follows. An external signal from the radar computer 56 is transmitted to the electronic control 55. This control signal is processed by the electronic control 55 which compares feedback signals from the electric motor 11 with the synchronizing gearbox 25 and generates an output command to said electric motor. The output command causes the electric motor 11 to rotate, which causes the gear reducer 19 and the drive sprocket 20 to rotate. The drive chain 15 transfers this rotation from the drive sprocket 20 to the nose wheel adapter sprocket 18. This causes the nose wheel adapter 13 to rotate. Rotation of the nose wheel adapter 13 causes the aircraft to rotate about an axis closely adjacent to the output shaft 26 of the synchronizing gearbox 25. The rotation of the aircraft is sensed by the synchronizing gearbox 25, whose output shaft 26 rotation is held fixed relative to the earth by the synchronous anchor 37. The sensed rotation is transmitted to the electronic control 55 enclosure to complete the feedback loop.

The apparatus of the invention may be used to rotate aircraft for measurement of optical, acoustic, or infrared signatures. Furthermore, the apparatus of the invention is not only portable, but maintains accurate position control and low radar signature, and may be used on unprepared surfaces. The apparatus of the invention accurately determines the angular position of aircraft despite linear displacements, and is easily adaptable to various aircraft.

While an embodiment of the present invention has been shown and described, it is to be understood that many changes and modifications may be made thereunto without departing from the spirit and scope of the invention as defined in the appended claims.

What is claimed is:

1. Portable RCS versus azimuth measurement apparatus for an aircraft to be tested, said aircraft being on a surface and having an axis of rotation, a nose landing gear wheel and main landing gear wheels, said apparatus comprising
   dolly means;
   nose wheel adapter means mounted on said dolly means for replacing said nose wheel of said aircraft with a spare nose wheel and rotating 90° so that said spare nose wheel is substantially perpendicular to the main landing gear wheels;
   synchronizing gearbox means positioned under said aircraft substantially at the axis of rotation of said aircraft and substantially rigidly coupled to said dolly means, said synchronizing gearbox means having an output shaft and sensing rotation of said aircraft about said axis of rotation of said aircraft, sensed rotation of said aircraft being indicated by rotation of said output shaft;
   synchronous anchor means on said surface beneath said output shaft of said synchronizing gearbox for restraining rotation of said output shaft relative to the surface; and
   control means electrically connected to said dolly means and to said synchronizing gearbox means for utilizing a radar computer signal to compare signals from said dolly means and from said synchronizing gearbox means to produce an output command to said dolly means for rotating said spare nose wheel thereby rotating said aircraft about an axis substantially at said output shaft of said synchronizing gearbox, said synchronizing gearbox transmitting signals indicating sensed rotation of said aircraft to said control means thereby providing data for RCS versus azimuth measurement.

2. Apparatus as claimed in claim 1, wherein said dolly means comprises a frame and an electric motor mounted on said frame and coupled to said spare nose wheel for rotating said spare nose wheel.

3. Portable RCS versus azimuth measurement apparatus for an aircraft to be tested, said aircraft being on a surface and having an axis of rotation, a nose landing gear wheel and main landing gear wheels, said apparatus comprising
   dolly means having motor means;
   nose wheel adapter means mounted on said dolly means and removably installable in replacement of the nose landing gear wheel of said aircraft for temporarily replacing said nose landing gear wheel with a spare nose wheel, said motor means being coupled to said spare nose wheel for rotating said spare nose wheel, said dolly means being rotated 90° so that said spare nose wheel is substantially perpendicular to said main landing gear wheels of said aircraft;
   beam means having a first end removably affixable to said dolly means and a spaced opposite second end extending under said aircraft and under the axis of rotation of said aircraft and between said main landing wheels;
   synchronizing gearbox means mounted on said beam means at the second end of said beam means and substantially at said axis of rotation of said aircraft, said synchronizing gearbox means having an output shaft and sensing rotation of said aircraft about said axis of rotation of said aircraft, sensed rotation of said aircraft being indicated by rotation of said output shaft;
   synchronous anchor means on said surface beneath said second end of said beam means for restraining rotation of said output shaft of said synchronizing gearbox relative to said surface; and
   electronic control means electrically connected to said motor means and to said synchronizing gearbox means for utilizing a radar computer signal to compare signals from said motor means and from said synchronizing gearbox means to produce an output command to said motor means for rotating said spare nose wheel thereby rotating said aircraft about an axis substantially coincident with said axis of rotation of said aircraft, said synchronizing gearbox transmitting signals indicating sensed rotation of said aircraft to said electronic control means thereby providing data for RCS versus azimuth measurement.

4. Apparatus as claimed in claim 3, wherein said dolly means comprises a frame having a detachable entry bar and said motor means is an electric motor mounted on said frame.

5. Apparatus as claimed in claim 4, wherein said aircraft nose landing gear wheel has an axle having spaced opposite ends and said dolly means further comprises a tachometer integral with said motor means, adjustable nose gear axle locating pins for alignment with the spaced opposite ends of the axle of the nose landing gear of said aircraft and engagement with said spaced opposite ends of said axle of said nose landing gear and drive means coupling the electric motor to said spare nose wheel for rotating said spare nose wheel.

6. Apparatus as claimed in claim 5, wherein said nose wheel adapter means has a nose wheel adapter sprocket affixed to said spare nose wheel and wherein said drive means of said dolly means comprises gear reduction means coupled to said electric motor, a drive sprocket coupled to said gear reduction means, a nose wheel adapter sprocket coupled to said spare nose wheel and a drive chain linking said drive sprocket and said nose wheel adapter sprocket whereby said electric motor rotates said spare nose wheel.

7. Apparatus as claimed in claim 6, wherein said beam means has centering cable attachment means at its second end and further comprising centering cable means affixed to said centering cable attachment means and said main wheels for centering said output shaft of said synchronizing gearbox means equidistantly between said main landing gear wheels of said aircraft.

8. Apparatus as claimed in claim 7, wherein said centering cable attachment means of said beam means comprises a pair of affixing means on spaced opposite sides of said beam means adjacent its second end and said centering cable means comprises a pair of tension cables and having a first end affixed to a corresponding one of said pair of affixing means and a spaced opposite second end affixed to a corresponding one of said main landing gear wheels of said aircraft and a pair of slack eliminating means each connected in a corresponding one of said pair of tension cables.

* * * * *

UNITED STATES PATENT AND TRADEMARK OFFICE
CERTIFICATE OF CORRECTION

PATENT NO. : 5,386,737
DATED : February 7, 1995
INVENTOR(S) : Walter S. Soeder, et al.

It is certified that error appears in the above-indentified patent and that said Letters Patent is hereby corrected as shown below:

Column 2, line 51: "second. end" should read --second end--

Column 6, line 6: "5" should read --51--

Signed and Sealed this

Sixteenth Day of May, 1995

BRUCE LEHMAN

*Attest:*

*Attesting Officer*         Commissioner of Patents and Trademarks